US009587966B2

United States Patent
Al-Jwesm

(10) Patent No.: US 9,587,966 B2
(45) Date of Patent: Mar. 7, 2017

(54) METHOD FOR DETERMINING STRESS IN FLEXIBLE JOINTS BY USE OF LEVELING MEANS

(71) Applicant: SAUDI ARABIAN OIL COMPANY, Dhahran (SA)

(72) Inventor: Farooq Nasser Al-Jwesm, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 643 days.

(21) Appl. No.: 13/650,516

(22) Filed: Oct. 12, 2012

(65) Prior Publication Data

US 2013/0192511 A1  Aug. 1, 2013

Related U.S. Application Data

(60) Provisional application No. 61/546,206, filed on Oct. 12, 2011.

(51) Int. Cl.
| | | |
|---|---|---|
| *G01D 7/00* | (2006.01) | |
| *G01M 5/00* | (2006.01) | |
| *G01M 11/08* | (2006.01) | |
| *F16L 27/108* | (2006.01) | |
| *F16L 51/02* | (2006.01) | |

(52) U.S. Cl.
CPC ............ *G01D 7/00* (2013.01); *F16L 27/1085* (2013.01); *F16L 51/022* (2013.01); *G01M 5/0091* (2013.01); *G01M 11/081* (2013.01)

(58) Field of Classification Search
CPC ....................................................... G01D 7/00

USPC ................ 33/645, 1 BB, 412, 529, 533, 1 H
See application file for complete search history.

(56) References Cited

U.S. PATENT DOCUMENTS

| | | | | |
|---|---|---|---|---|
| 2,638,676 | A * | 5/1953 | Callahan ......................... | 33/412 |
| 3,842,509 | A * | 10/1974 | Wyman et al. ................. | 33/645 |
| 3,845,657 | A | 11/1974 | Hall et al. | |
| 4,099,746 | A | 7/1978 | Kontsch et al. | |
| 4,318,436 | A * | 3/1982 | Shurman ....................... | 152/523 |
| 4,406,482 | A * | 9/1983 | Clebant ......................... | 285/114 |
| 4,413,415 | A * | 11/1983 | Stovall ............................ | 33/661 |
| 4,472,883 | A * | 9/1984 | Ortega ............................ | 33/518 |
| 4,635,533 | A | 1/1987 | Whiteside, II | |
| 4,672,751 | A * | 6/1987 | Jones .............................. | 33/286 |
| 5,392,526 | A * | 2/1995 | Sprague et al. ................ | 33/529 |
| 5,529,346 | A | 6/1996 | Sperring | |
| 5,655,476 | A * | 8/1997 | Wolter ........................... | 116/212 |
| 5,930,908 | A * | 8/1999 | Patrisso et al. ................. | 33/600 |
| 6,631,928 | B1 | 10/2003 | Sakata | |
| 7,111,688 | B2 | 9/2006 | Vanbilderbeek | |
| 7,308,766 | B2 * | 12/2007 | Wallace ........................... | 33/371 |
| 7,730,846 | B2 * | 6/2010 | Pett et al. ...................... | 116/212 |
| 8,365,429 | B2 * | 2/2013 | Lawrence et al. ............. | 33/562 |

* cited by examiner

*Primary Examiner* — Christopher Fulton
(74) *Attorney, Agent, or Firm* — Abelman, Frayne & Schwab

(57) ABSTRACT

The invention relates to a method for determining if a flexible joint means is out of alignment, i.e., if excess torque or pressure has caused malformation or malpositioning of the joint means. This is accomplished by incorporating a flexible leveling means onto a visible surface of the joint means. The leveling means has horizontal and vertical markings which permit simple visible inspection of the joint and a simple determination of the position and condition of the joint.

4 Claims, 3 Drawing Sheets

PRIOR ART

METHOD FOR DETERMINING STRESS IN FLEXIBLE JOINTS BY USE OF LEVELING MEANS

This application claims priority of U.S. patent application Ser. No. 61/546,206 filed on Oct. 12, 2011, and incorporated by reference herein

FIELD OF THE INVENTION

This invention relates to a simple means for visual determination of whether a joint means is or has been subject to excessive strain, and/or has been installed incorrectly.

BACKGROUND AND PRIOR ART

Flexible joint means are used in many mechanical systems, both simple and complex. Flexible joints, especially flexible pipe joints, are one type of this family of joint means. An example of such a flexible joint is presented in FIG. 1. In operation, these flexible joint means are positioned in between other structures, such as pipes, and act, e.g., to "cushion" or to equilibrate pressure or other forces that are applied to the mechanical systems in which they are utilized. In essence, these joints serve to absorb stress and movement from the mechanical means of which they are a part. An example of a flexible joint, in operation, is shown in FIG. 2, where the flexible joint is positioned in between a part of pipe means, and is compressed. A depiction of such a joint under tension is shown in FIG. 3.

As may be gathered from, e.g., the figures, it is critical that flexible pipe joints, or any other joint, be installed properly and that their functioning be monitored carefully. If the joints are disposed improperly, an example of which is shown in FIG. 4, the results can include misalignment of the mechanical device in which the joints are deployed, excess or unequal pressure, and eventual malfunction of the devices and apparatus.

Various means are known for determining if a joint is deployed in such a way that excess pressure is measured. So-called "foil strain gages" represent an example of this. Such gages are attached to the joint, move up and down with the joint and measure strain applied thereto, providing an electronic signal which is read via an outside means, which in turn provides some sort of determinable signal. See, e.g., U.S. Pat. Nos. 7,111,688; 5,529,346; 6,631,928; 4,635,533; 4,099,746; and 3,845,657 all of which are incorporated by reference in their entirety as examples of various types and deployments of strain gages.

In considering the bases by which these devices function, it is important to keep the definitions of "strain" and 'stress" that are used herein in mind. "Strain" is the amount of deformation of a body due to applied force, i.e., the amount of deformation, per unit length of an object, when a weight or pressure is applied. "Stress," defined as the object's internal resisting force, is also called strain.

Measuring strain is certainly an important part of making sure an apparatus functions properly; however, the inventor has ascertained that the classical approach to measuring what is referred to as strain, can also be done so visually, and simply, by utilizing what will be referred to as a "level indicating means," which is useful in determining whether or not strain has been placed on a joint means.

SUMMARY OF THE INVENTION

The invention relates to an apparatus, referred to hereafter as a "level indicating means" which is useful in determining whether or not a joint means is deployed and functioning properly.

DETAILED DESCRIPTION OF PREFERRED EMBODIMENTS

Figure 1:
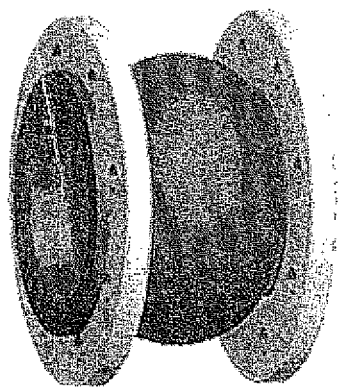
FIG. 1 shows a typical, flexible joint.
Figure 2:
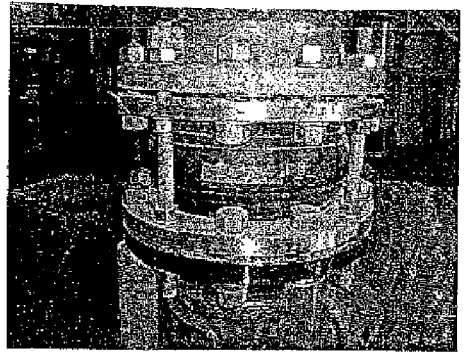
FIG. 2 shows a flexible joint, such as that in FIG. 1, in operation.
Figure 3:
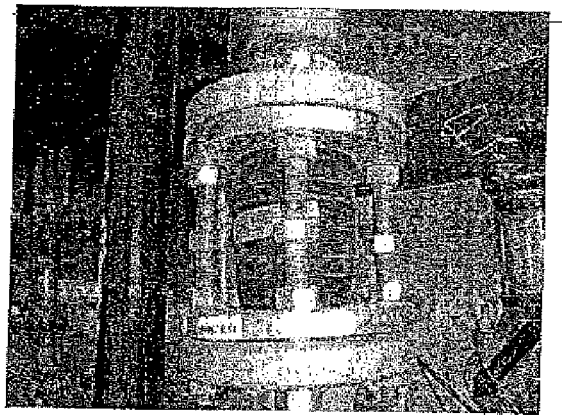
FIG. 3 shows a typical flexible joint means under compression.
Figure 4:
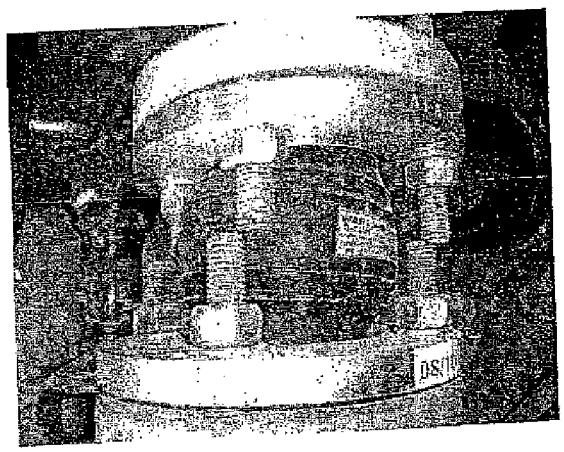
FIG. 4 shows a flexible joint means that has been misaligned.
Figure 5:
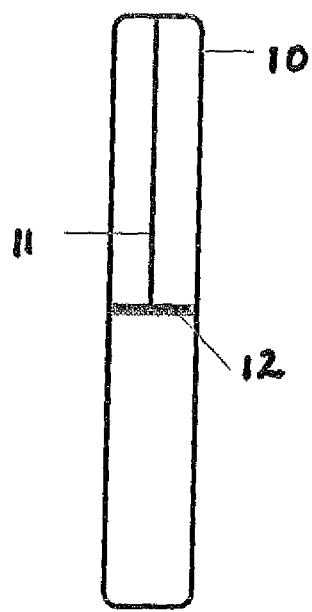
FIG. 5 shows an embodiment level of a determining means in accordance with the invention.

The various embodiments of the invention include devices, such as that depicted in FIG. 5, which are made with a predetermined tolerance which is the same as that of the joint or joints with which they will be used. The skilled artisan will understand and appreciate that joints of the type described herein are manufactured with predetermined tolerances. It is when these tolerances are exceeded that the joints experience strain, which in turn is evidenced in a device such as FIG. 5.

The material used to make the devices of FIG. 5 may be metallic or non-metallic. The only structural requirement is that they must be flexible, so that they move with the joint means. Preferably, the leveling means are made of rubber, as are the joint means transparent rubber is preferred. To facilitate visual inspection, the leveling means may be a different, contrasting color from the joint means to which it is joined. Fluorescent, luminescent, and other easily visible colors are all examples of such contrasting colors.

Flexible joint means as used range in diameter from 1" to 120." it will be understood that the leveling means employed will vary in size, based upon the size of the joint means.

In operation, the level indicating means may be incorporated, e.g., by being interwoven, into the joint means during production of the joint. In the alternative, it may be appended to the device via any standard adhesive or other means of fixing it thereto.

Referring again to FIG. 5, the leveling indicating means "10" is provided with both a vertical marking "11" and a horizontal marking "12." These serve to indicate whether excessive torque is placed on the joint, or the joint is out of alignment ("11"), or if the joint is exposed to excess compression or elongation ("12"). This can be seen via the movement of the relevant marker. In the case of "11," the marker moves laterally, when the joint is out of alignment or excessive torque has been applied. In the case of "12," the indicator moves vertically, if excess compression or elongation is applied to the joint.

In operation, simple visual inspection allows the operator to observe whether the indicators 11 and 12 have in fact moved, and permits determination of excessive strain or inappropriate positioning of the joint. The ability to determine these criteria rapidly permits prompt alleviation of the condition causing tern, and potentially avoids much greater system failures.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

I claim:

1. Method for determining if a flexible joint is out of alignment, comprising affixing thereto a flexible leveling means having a horizontal marking and a vertical marking, said markings moving with said flexible joint when pressure is applied thereto, and observing said flexible leveling means for misalignment of least one said marking, said misalignment indicating said joint means is misaligned, wherein said flexible leveling means is incorporated into a visible surface of said flexible joint via being interwoven into a visible surface of said flexible joint means during production of said joint means.

2. The method of claim 1, wherein said leveling means is made of rubber.

3. The method of claim 2, wherein said rubber is transparent rubber.

4. The method of claim 1, wherein said flexible joint leveling means is a different color than said flexible joint means.

* * * * *